Dec. 16, 1924.
A. L. HARRIS
SHOCK ABSORBER
Filed Oct. 8, 1923
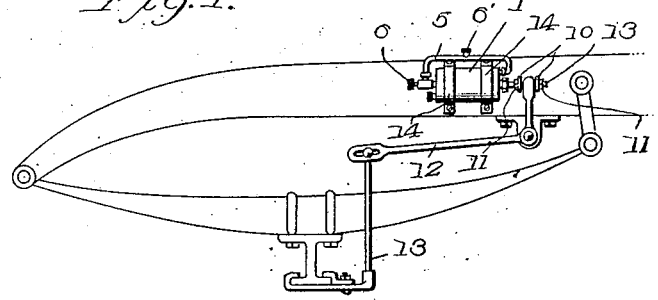
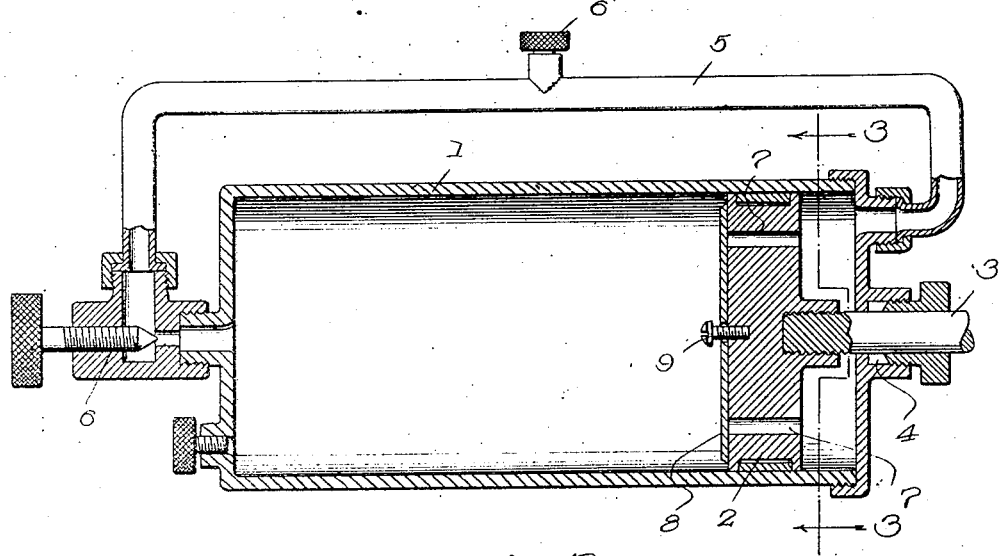
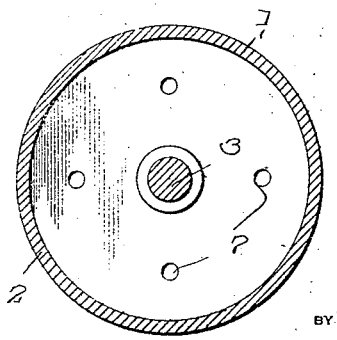
Albert L. Harris
INVENTOR
BY Victor J. Evans
ATTORNEY
WITNESS:

Patented Dec. 16, 1924.

1,519,451

UNITED STATES PATENT OFFICE.

ALBERT L. HARRIS, OF AUSTIN, TEXAS.

SHOCK ABSORBER.

Application filed October 8, 1923. Serial No. 667,333.

*To all whom it may concern:*

Be it known that I, ALBERT L. HARRIS, a citizen of the United States, residing at Austin, in the county of Travis and State of Texas, have invented new and useful Improvements in Shock Absorbers, of which the following is a specification.

This invention relates to a shock absorber mainly designed for motor vehicles, the general object of the invention being to provide a cylinder part containing liquid and a piston part in the cylinder and the movement of which is checked by the liquid therein with means for connecting one part to the body of the vehicle and the other part to the chassis thereof.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the device in use.

Figure 2 is an enlarged longitudinal sectional view.

Figure 3 is a section on line 3—3 of Figure 2.

As shown in these views the device comprises a cylinder 1 and a piston 2, the piston rod 3 of which passes through a packing gland 4 at one end of the cylinder. The cylinder is filled with oil or the like and it is provided with a bypass 5 which connects the front end of the cylinder with the rear end. Communication between the rear end of the cylinder and the bypass is controlled by a needle valve 6 and said bypass may be provided with a plug closed filling opening as shown at 6'. The piston is provided with ports 7 which are controlled by a disc valve movably held to the rear face of the piston by the bolt 9. Thus the piston can move freely from the rear end of the cylinder to the front end thereof as the valve will open and permit the oil to pass from one side of the piston to the other but on the return stroke the valve will set itself and prevent the passage of oil through the ports so that the oil must pass through the bypass which is restricted by the needle valve so that the piston can move but slowly on its return stroke. A pair of discs 10 are held on the piston rod by the nuts 11 and the forked end of the bell crank lever 12, the ends of the prongs of which are rounded engaging said discs. This bell crank lever may be fastened to the axle or a part of a spring by the connections 13 while the piston is connected to a part of the frame by the brackets 14. It will of course be understood that the device can be attached in any desired manner to any desired parts.

It will be seen that the device will act to check the rebound of the springs and thus make more comfortable riding and prevent damage to the springs.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a cylinder containing a fluid, a bypass connecting the ends of the cylinder together, a valve for controlling the flow of fluid through the bypass, a piston having ports therein, a valve plate movably connected with one face of the piston and preventing the fluid from passing through the ports when the piston is moving in one direction, a filling nipple on the bypass, a plug for closing the same, means for connecting the piston and cylinder with a part of a vehicle, such means including a bell crank lever having one end forked and a pair of discs on the piston rod between which the forked ends are located.

In testimony whereof I affix my signature.

ALBERT L. HARRIS.